(12) United States Patent
VanOsdol et al.

(10) Patent No.: US 11,185,811 B1
(45) Date of Patent: Nov. 30, 2021

(54) ROTATIONAL MECHANICAL GAS SEPARATOR

(71) Applicant: Energy, United States Department of, Washington, DC (US)

(72) Inventors: John G. VanOsdol, Fairmont, WV (US); Danylo B. Oryshchyn, Philomath, OR (US)

(73) Assignee: U.S. Department of Energy, Washington, DC (US)

( * ) Notice: Subject to any disclaimer, the term of this patent is extended or adjusted under 35 U.S.C. 154(b) by 242 days.

(21) Appl. No.: 16/299,888

(22) Filed: Mar. 12, 2019

(51) Int. Cl.
 *B01D 49/00* (2006.01)
 *B01D 53/00* (2006.01)
 *B01D 45/14* (2006.01)

(52) U.S. Cl.
 CPC ........... *B01D 53/002* (2013.01); *B01D 45/14* (2013.01); *B01D 49/006* (2013.01)

(58) Field of Classification Search
 CPC .................................................... B01D 49/006
 See application file for complete search history.

(56) References Cited

U.S. PATENT DOCUMENTS

RE29,128 E * 2/1977 Sohre ........................ F01D 1/04
 239/289
8,771,401 B2 * 7/2014 VanOsdol ................ F25J 3/067
 95/29

OTHER PUBLICATIONS

Chen, G. et al., "The radial dimension of a supersonic jet expansion from conical nozzle," American Institute of Physics, AIP Advances 6, (2016), pp. 11505-1 to 115015-7.

* cited by examiner

*Primary Examiner* — Robert A Hopkins
(74) *Attorney, Agent, or Firm* — Timothy L. Harney; Daniel D. Park; Brian J. Lally (57) ABSTRACT

The invention provides a system for removing target moieties from gas streams, the system comprising a supersonic expander coaxially positioned within an array of oblique shock inducers. Also provided is a method for removing target moieties from gas streams, the method comprising simultaneously subjecting the streams to supersonic expansion and oblique shock compression.

14 Claims, 8 Drawing Sheets

ROTATIONAL MECHANICAL GAS SEPARATOR

GOVERNMENT INTEREST

The U.S. Government has rights in this invention pursuant to the employer-employee relationship of the Government to the inventors as U.S. Department of Energy employees and site-support contractors at the National Energy Technology Laboratory.

FIELD OF THE INVENTION

This invention relates to a method and a system for separating liquid and solid phase substances from a gas stream and more specifically, this invention relates to a method and a system for separating liquid components (e.g. $H_2O$, $CO$, $CO_2$), and or solid components (e.g. $H_2O$, $CO$, $CO_2$) from effluent.

BACKGROUND OF THE INVENTION

Removal and sequestration of $CO_2$ and other moieties from gas streams continues to be researched. State of the art methods include adsorption monoliths such as those researched at Oak Ridge National Laboratories, membrane absorption, and cryogenic distillation.

The aforementioned techniques require special materials and/or high maintenance.

Other state of the art removal techniques, such as centrifugal stratification, compress the target moieties into a liquid or solid phase, then remove same from the gas stream. But during removal, the liquid/solid phases travel through flow fields and their viscous heating effects. This causes the liquid/solid phases to re-vaporize, therefore stymieing separation efforts.

A need exists in the art for a method and system to efficiently remove targeted moieties from gas streams, such as those generated at power plants. The method and system should be integrated so as to be modular and/or require a small footprint. The method and system should utilize low cost technology and not require special adsorbents or other proprietary substrates. Finally the method and system should remove from 50 percent to 100 percent of the target moieties depending on the aerodynamic design, geometrical design and operating conditions.

SUMMARY OF INVENTION

An object of the invention is to provide a system and method for removing targeted moieties from gas streams that overcomes many of the drawbacks of the prior art.

Another object of the invention is to provide a system and method for efficiently extracting target moieties from gas streams. More than one moiety may be removed simultaneously. A feature of the invention is combining supersonic expansion and oblique shock compression (SEOSC) to liquefy and/or solidify the target moieties to facilitate their removal from the gas streams. An advantage of the invention is that no specialty chemicals or training is necessary.

Yet another object of the invention is to provide a method for extracting condensed liquid and solid components, (e.g. $H_2O$, $CO$, $CO_2$) from a gas stream. A feature of the invention is imparting a ridged body rotation to an outward radial flow of gas which has an initial supersonic expansion followed by an oblique shock compression. An advantage of the method is that it maintains both the supersonic expansion and the oblique shock compression flow processes to be as nearly irrotational and inviscid as is possible. This is done to minimize any thermal heating effects and recompression effects caused by boundary layers. Another advantage is that the efficiency of the extraction is enhanced given a near instantaneous application of both fluid effects on the gas stream.

Still another object of the invention is to provide a method and system for separating $CO_2$ from a bulk raw gas flow. For example, the invention may be applied to an effluent stream of a conventional power plant, particularly if that stream is pressurized. In such a case, $H_2O$ and/or $CO_2$ and/or $CO$ would precipitate out. A feature of the invention is the coaxial positioning of a circular array of supersonic expanders within a circular array of oblique shock inducers. An advantage of the invention is that the configuration produces a subsonic multi-phase radial and rotating flow in the outer collection vessel.

Another object of the invention is to provide a mechanical means for liquidizing or solidifying gaseous target molecules from a gas stream for separation. A feature of the invention is that no sorbent or solvent is necessary to implement the system or process. An advantage is that flue gas may not need to be pretreated (such as dried) prior to separation procedures. Another advantage is that solids handling is no longer a formidable task.

Another object of the invention is to provide a compact system and process for separating target molecules from a carrier gas stream. A feature of the invention is the encapsulation of a supersonic gas expander and an oblique shock diffuser within the confines of a particle separator. Another feature is the implementation of rigid body rotation to the expander and compressor. An advantage of the invention is that particle separation becomes an integral part of the expansion and compression processes.

Another advantage is that the integration of all three processes allows its implementation to be used as a recirculation pump for the carrier gas.

Briefly, the invention provides a method for removing target moieties from gas streams, the method comprising simultaneously subjecting the streams to supersonic expansion and oblique shock compression along with ridged body rotation.

Also provided is a system for removing target moieties from gas streams, the system comprising a supersonic expander coaxially positioned within an array of oblique shock inducers.

BRIEF DESCRIPTION OF THE DRAWINGS

The invention together with the above and other objects and advantages will be best understood from the following detailed description of the preferred embodiment of the invention shown in the accompanying drawings, wherein:

FIG. 4 is shown as 12 in FIG. 5 and is situated inside the concentric array of wedge shaped oblique shock inducers 28 and rotates with them;

FIGS. 7 A-B are a schematic view of the system in operation, in accordance with features of the present invention.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides an inviscid irrotational process for separating target moieties from a gas stream. Multiple components could be made to condense or to solidify out. For example, a syngas stream comprised of $H_2O$, CO, $CO_2$ and $H_2$ could be expanded, and recompressed so that the $H_2O$, CO and $CO_2$ would precipitate out leaving only enriched $H_2$. The $H_2O$ would come out first, and the CO and $CO_2$ would come out second.

The process could also be designed to selectively get only the $H_2O$ out but leave the CO, $CO_2$ and $H_2$ in a gaseous state.

The process and system may receive raw or scrubbed and dehydrated flue gas from a combustion process providing a gaseous stream comprised of $N_2$, $CO_2$, Hg, K, $O_2$ and perhaps particulates, wherein the $CO_2$ and/or other compounds and elements are targeted for removal.

The invented process and system is applicable for removal of $H_2O$, CO, $CO_2$, $CH_4$ or any component of a syngas stream or any other gas mixture, while the carrier gas, which is the predominant component of the gas mixture, remains in gaseous state. For example, the invention can be applied to Integrated Gasification Fuel Cell (IGFC) systems to enrich $H_2$ in a syngas stream by condensing out all of the other components leaving only $H_2$ in a gaseous state.

Supersonic velocities are based on achieving phase change of the target compound, while maintaining non-target moieties in gas phase. As such, phase change diagrams are consulted to determine optimal pressures and temperatures for specific moiety separation.

Application areas for the invention include any gas separation process, high pressure gasification systems (in which case the pressurized process can be operated very efficiently), gas turbine fuel cell hybrid systems, gas recirculation pumps, and others. The raw or treated gas may be supplied to the expansion means at a first pressure range of about 50 atmospheres and below. The carrier gas may be $N_2$ and the target constituent $CO_2$.

In the context of a magnetohydrodynamic MHD generation topping cycle—this separator may remove potassium-salt seed particles for recovery. The temperatures at which $K_2CO_3$ reforms from K+ and combustion products is high, so the shocking design is adjusted accordingly. After seeded combustion-gases surrender heat first to open-cycle, and then closed-cycle MHD, the carbonates are removed to prepare the gas to drive a turbine. In the context of coal combustion Hg would drop out as well—especially if there are NOx molecules in the gas.

Figure 1:
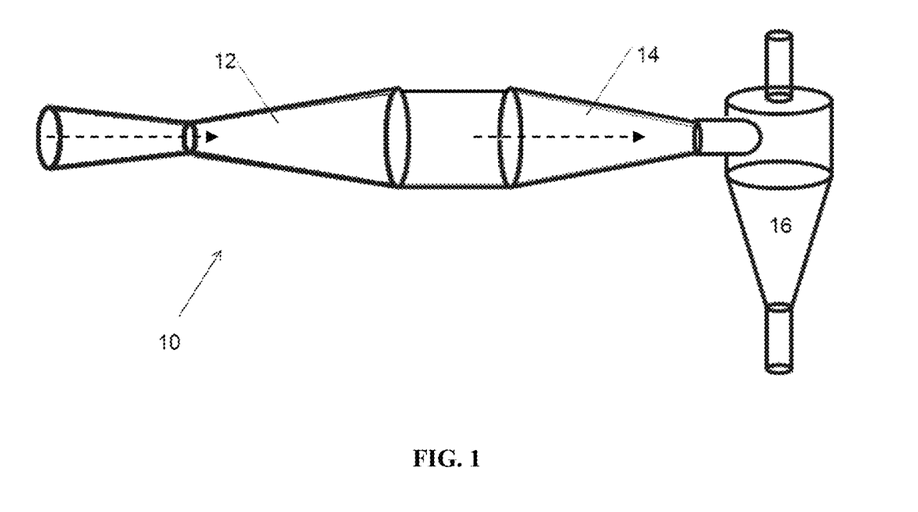
FIG. 1 is a schematic drawing of a method for separating target compounds from a gas stream, in accordance with features of the present invention.

FIG. 1 is a schematic diagram of the invented system, the system designated as numeral 10. The stream is first rapidly expanded 12 to produce a liquefied or solidified target moiety, and therefore a multiphase fluid stream. The expander accelerates the gaseous mixture to a supersonic flow having a velocity specific of the moiety to be targeted and separated from the gas stream. Adiabatic cooling of the gas mixture during this supersonic expansion step results in the phase change.

The fluid stream is then compressed 14 or decelerated to a subsonic velocity. (The expansion step upstream may be ongoing during this deceleration step.) This compression enables the liquefied/solidified target material to pass through the remaining gas stream without contacting the heated boundary layers inherent with such compression. The liquefied or solidified target material is subsequently separated from the stream via conventional means such as a solid separator (e.g., centrifugal, electrostatic impingement) 16.

The system 10 may be serially applied to the same gas stream source to independently separate multiple target moieties. Alternatively, a plurality of systems may be imposed on the same gas stream simultaneously to extract different moieties at the same time.

The gaseous target moiety and the carrier gas comprising the gaseous stream have comparative properties such that the target moiety changes phase from the gaseous state by desublimation or condensation at a higher temperature than the carrier phase, over a given pressure range where the separation operation is to be conducted. The gaseous mixture is accelerated to a supersonic velocity causing a pressure and temperature decrease, followed by a deceleration resulting in a pressure and temperature increase. The acceleration and deceleration provide a temperature and pressure profile such that the target moiety changes phase from the gaseous state by desublimation or condensation, thereby producing a non-gaseous collectible constituent. The carrier gas remains in the gaseous phase.

Figure 2:
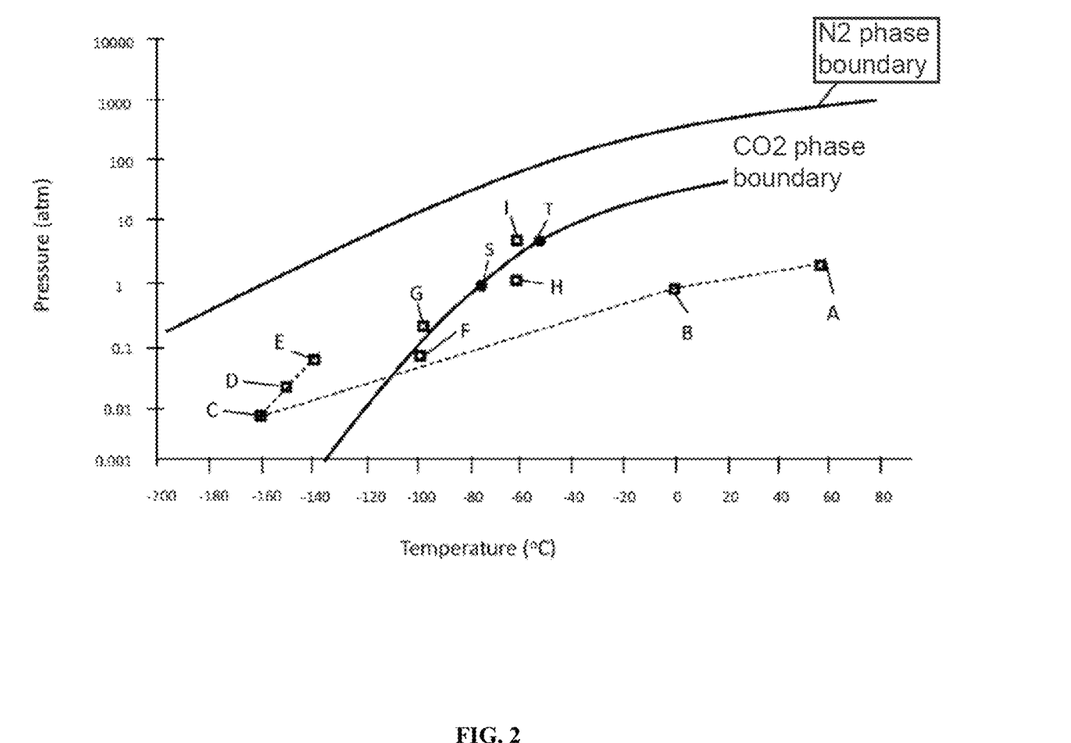
FIG. 2 is a phase diagram showing expansions and contractions of a target moiety, in accordance with features of the present invention.
Figure 3:
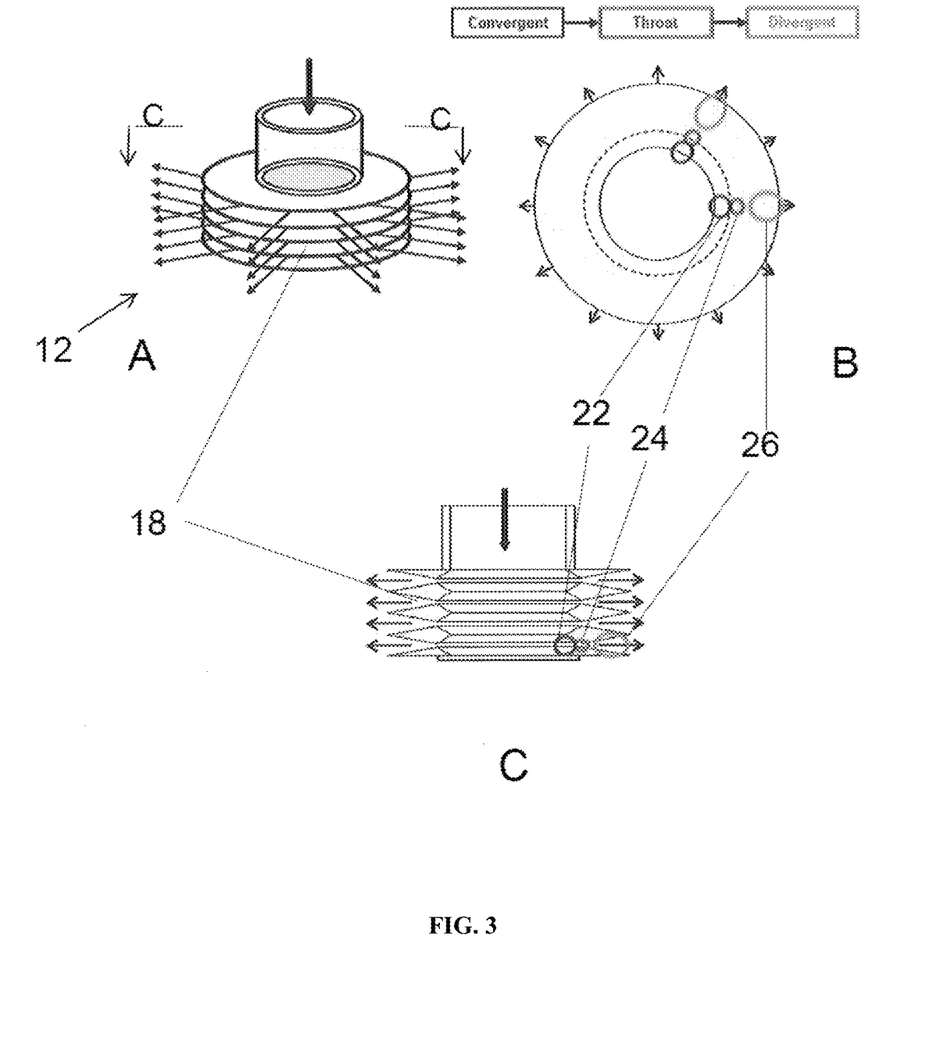
FIGS. 3A-C depict various views of an axial array of supersonic nozzles which produce a radially expanding supersonic flow which is directed away from the central axis.
Figure 4:
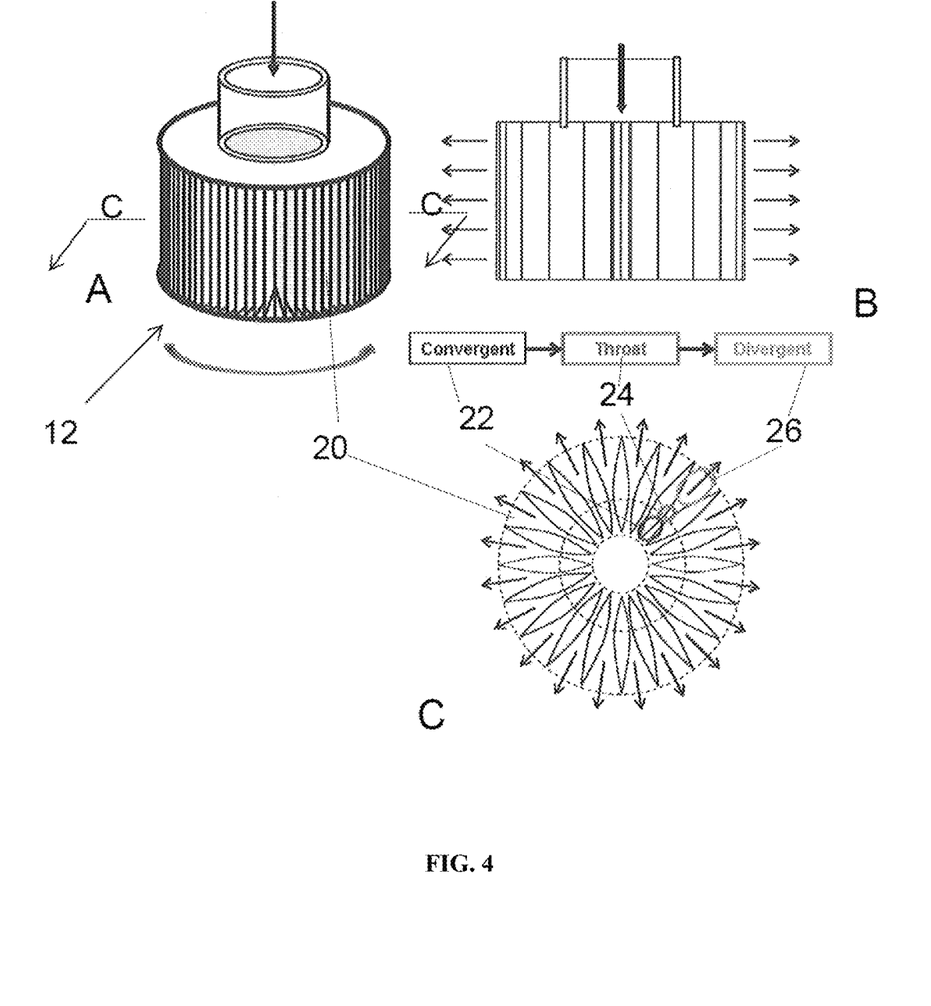
FIGS. 4A-C depict various views of a circumferential array of supersonic nozzles which produce a radially expanding supersonic flow which is directed away from the central axis.

The temperature and pressure of the gaseous stream decrease during the acceleration to the specified supersonic velocity. FIG. 2 represents $N_2$ phase boundary and $CO_2$ phase boundary on the logarithmic plot of pressure and temperature.

Expander/Nozzle Detail

With reference to FIG. 2, a gaseous mixture enters the expander (i.e. a flow accelerator) 12 at a pressure and temperature condition represented by point A. The gaseous mixture is accelerated to a specified supersonic velocity by the expander 12 and achieves an acceleration temperature and an acceleration pressure, represented by the temperature and pressure condition at point C, via the path A-B-C. As shown, point C is at a lower temperature and pressure in the process than injection point A.

The expander 12 is a nozzle or an array of nozzles each of which are adapted to receive a gaseous mixture flow $G_o$ comprised of a carrier gas and a gaseous constituent (or several targeted constituents). The expander accelerates the flow to a specified supersonic velocity, producing supersonic flow $G_s$. For example, the expander 12 may be a converging-diverging nozzle designed to accelerate gaseous mixture flow $G_o$ from an initial subsonic velocity to a specified supersonic velocity.

Within this disclosure, supersonic flow $G_s$ is comprised of the carrier gas in a gaseous phase, and either the gaseous constituent in a gaseous phase or the collectible constituent in a non-gaseous phase. Additionally, within this disclosure, when the supersonic flow achieves the acceleration temperature and acceleration pressure, this indicates that at least the gaseous phases of the supersonic flow are at the acceleration temperature and acceleration pressure condition. Any non-gaseous phases including the collectible constituent, if formed, may or may not have the equivalent temperature and pressure condition.

The acceleration temperature and acceleration pressure resulting from acceleration to a specified supersonic velocity may be predicted or otherwise determined by those skilled in the art for a given gaseous mixture and flow expander 12. As will be discussed infra, within this disclosure, the acceleration temperature and acceleration pressure must decrease sufficiently during the acceleration such that the gaseous constituent either crosses a phase boundary during the acceleration, or crosses a phase boundary during the subsequent deceleration, when the supersonic flow transits the deceleration temperature-pressure profile originating at the acceleration temperature and acceleration pressure.

As discussed supra, a means for rapidly expanding the gas stream may be a supersonic nozzle or a plurality of nozzles, the latter of which is arranged in a predetermined configuration, such as orthogonally extending from a common manifold, or circularly arranged about a common center.

A supersonic expansion nozzle has three district regions. There is a convergent section which has a continually decreasing cross-sectional area. In this section the flow accelerates from a subsonic speed of low Mach number to a near sonic speed at the end of the contraction section under the action of a pressure gradient. Although the flow at the end of the contraction section is near sonic speed it is still subsonic. This is followed by the throat section where the rate of change in the cross-sectional area changes from a contraction to an expansion. This causes the flow to make a transition from subsonic speed to supersonic speed. The throat is then followed by an expansion section were the cross-sectional area is continuously increased. Since the flow emerging from the throat area into the expansion section is slightly supersonic the expanding area in the expansion section causes the flow to accelerate to a much higher Mach number.

Either an axisymmetric nozzle where the cross-sectional area is typically circular, or a 2-D nozzle where the cross-sectional area is rectangular are suitable configurations. In an axisymmetric nozzle the diameter of the circular cross-section changes along the nozzle axis while in a 2-D nozzle the height of the rectangular cross-section changes along the nozzle axis while the width remains constant.

A plurality of supersonic nozzles are arranged to form a cylindrical array. Two different configurations of these arrays are shown in FIGS. 3 and 4. FIG. 3C shows that the height of the cross-sectional area of each nozzle in the array changes along the radial vector which is also the flow axis. This is very much like the 2-D nozzle with the exception that in this configuration the nozzle width is not constant. The nozzle width in this configuration increases with radial distance because the width is also the circumference of the circle.

FIG. 4C shows that the height of each nozzle in the array remains constant while the width of each nozzle changes along a radial vector which is also the flow axis. In both cases we have a contraction section where the cross-sectional area decreases followed by a throat section where the cross-sectional area changes from a contraction to an expansion followed by an expansion section where the cross-sectional area increases.

Aerodynamic separation nozzles as are disclosed in U.S. Pat. Nos. 9,050,550; 8,313,547; and 8,016,901 cannot be used in the instant method and system given their propensity to create highly rotational flows. Such flows induce compression waves and shock waves on the inward turning wall and expansion waves on the outward turning wall. These complex flow structures interact and form a highly non-uniform rotational flow existing in the expansion section with significant production of shear stress and frictional heating. The result is that the entire axial direction of the flow field rotates along with the flow field itself. This allows the flow to be radially expanded and recompressed in a turning apparatus as an inviscid, irrotational flow without using shear stress forces that are generated from friction that is caused by swirl or turning of the side walls.

Thus, the flow field provided in the instant invention will not experience high shear stress, and thus not suffer frictional heating because the entire flow is rotated during both the expansion, and the compression. After the oblique shock diffusion process, the flow has been recompressed and it is in a subsonic state but it is still rotating with the same ridged body rotation of the apparatus. Therefore, in the annular region outside of the shock inducers, the flow will be rotational, but the very high shear stresses will not be a significant heating factor and mechanical particle separation can occur as it does in any cyclone separator.

In summary, preferably, any flow imposed by the supersonic nozzle remains inviscid and irrotational, with the bulk flow not having any shear strain.

A means for rapidly compressing the gas stream may be an oblique shock diffuser or a plurality of oblique shock diffusers. A plurality of oblique shock diffusers may be arranged in an cylindrical array or an axial array. After the radial flow passes through the oblique shock inducers, it has been shocked down to a subsonic state and so it may be treated as a subsonic multi-phase flow.

A salient feature of the invention is that the means for expanding the gas stream may be coaxially aligned and nested or otherwise positioned within the means for compressing the gas stream. This causes the simultaneous expansion and compression of a gas stream, thereby enabling immediate and long lasting separation of target compound from the gas stream for subsequent collection.

An exemplary nozzle is explained in U.S. Pat. No. 8,771,401, awarded to the applicant and incorporated herein in its entirety by reference.

The nozzle may be configured in a plurality of planar segments and arranged in a circular fashion so that the effluent of the carrier gas and the solid particles from the exit plane of the supersonic expander forms a radial flow. This radial flow is directed outward from the cylindrical expander exit plane.

A set of nozzles may be arranged in a circle with a first upstream end of each nozzle situated proximal to the center of the circle and a second downstream end situated proximal to the periphery of the circle. A plurality of circular arrays are collinearly arranged to form a cylindrical array. This cylindrical array therefore comprises a plurality of rows of nozzles each row defining a plane perpendicular to adjacent planes. The cylindrical array further defines a central shaft adapted to receive a fluid feed stream.

Each of the nozzles comprising the cylindrical array rotate about the axis of the array. All of the nozzles may turn in unison, which is to say a ridged body rotation is imparted to the entire array. Alternatively, some of the nozzles may not turn in unison with the rest of the nozzles. This serves to tune the system by optimizing pumping efficiency and adjust to any changes in the inlet-gas composition.

FIGS. 3 and 4 are perspective views of suitable fluid expansion means. FIG. 3 depicts an expander featuring axially arrayed horizontally disposed slots 18 stacked upon each other to form a cylinder, as described supra. The array of nozzles is configured in such a way so that the exit plane of each nozzle in the array forms a right cylinder. The exit plane area for each nozzle in the array is the external area of the right cylinder which is equal to the height of the cylinder, measured along the vertical axis, multiplied by the width of the nozzle exit plane, which corresponds to the circumference of the cylinder, and is aligned with the horizontal. For each nozzle in the array the height of the nozzle exit plane is small in comparison to the width or circumference of the nozzle exit plane and so when a plurality of these nozzles is stacked along the vertical central axis the height of the exit plane of each nozzle in the array adds together to form the height of the overall array. For each individual nozzle in the array there is an initial area contraction starting at the inner radius of the array shown in FIGS. 3B-C as region 22. This is the subsonic acceleration portion of the nozzle. This is followed by a throat section shown in FIGS. 3B-C as region 24 where the gas makes a transition from a subsonic flow to a supersonic flow. This is followed by an expansion section shown in FIGS. 3 B-C as region 26 which is the supersonic portion of the nozzle. The flow thus passes in a radially outflowing direction from the inner radius through the contraction section, then through the throat section, and finally through the expansion section to the nozzle exit plane as the radius increases. This changing cross-sectional area is necessary to achieve a supersonic flow. For this configuration the initial area contraction is accomplished by decreasing the vertical height of each nozzle in the array with the increasing radius until the throat section is encountered. At this point the vertical height of the nozzle is increased giving an area expansion into the supersonic section FIG. 4 depicts an expander with circularly arrayed, vertically disposed slots 20. Each of the horizontal 16 and vertical slots are configured with areas imparting contraction and expansion on the fluid. These contractions are not venture in nature. The array of nozzles is configured in such a way so that the exit plane of each nozzle in the array forms an angular section on the exterior surface of a right cylinder. The width of the exit plane section for each nozzle is measured along the vertical axis and extends the entire length of the cylinder from the top to the bottom. The height of the exit plane section for each individual nozzle is measured along the horizontal axis and extends over a small arc on the circumference of the cylindrical array. For each nozzle in the array the height of the nozzle exit plane is small in comparison to the width so that when a plurality of these nozzles is arranged concentrically around a central axis the exit planes of each nozzle together form the entire surface of a right cylinder. For each individual nozzle in the array there is an initial area contraction starting at the inner radius of the array shown in FIGS. 4 B-C as region 22. This is the subsonic acceleration portion of the nozzle. This is followed by a throat section shown in FIGS. 4 B-C as region 24 where the gas makes a transition from a subsonic flow to a supersonic flow. This is followed by an expansion section shown in FIGS. 4B-C as region 26 which is the supersonic portion of the nozzle. The flow thus passes in a radially outflowing direction from the inner radius through the contraction section, then through the throat section and finally through the expansion section to the nozzle exit plane as the radius increases. This changing cross-sectional area is necessary to achieve a supersonic flow. For this configuration the initial area contraction is accomplished by decreasing the height of each nozzle in the array with the increasing radius until the throat section is encountered. At this point the height of the nozzle is increased giving an area expansion into the supersonic section Both configurations do form radial supersonic nozzles with an initial contracting section, which accelerates a subsonic flow up to a sonic condition in the throat section where the change in cross-sectional area is zero, then followed by an expanding cross-sectional area where the flow passes from sonic speed to supersonic speed. Both configurations will form a radially expanding supersonic flow at the exit plane. They impart a radially directed supersonic flow, first subjecting raw fluid flow to a convergent region 22 (which is situated proximal to the center of the expander), then a throat region 24 (which is situated downstream from the convergent region, and then a divergent region 26 (which is situated proximal to the periphery of the expander.

Compressor Detail

FIG. 5 shows a cylindrical supersonic expander coaxially positioned inside another cylindrical apparatus comprising a plurality of oblique shock inducers, also arranged in a circular configuration. As the supersonic flow continues to expand radially outwide of the cylindrical expander exit planes, it encounters the ring of oblique shock inducers and forms a similar oblique shock pattern in the open space between the shock inducers.

The flow passing through both the cylindrical supersonic expander and the cylindrical oblique shock inducers with be directed radially outward. The flow comprises carrier gas which remains in the gaseous state and the solid or liquid particles of the target component that has changes phase from its original gaseous state.

Figure 5:
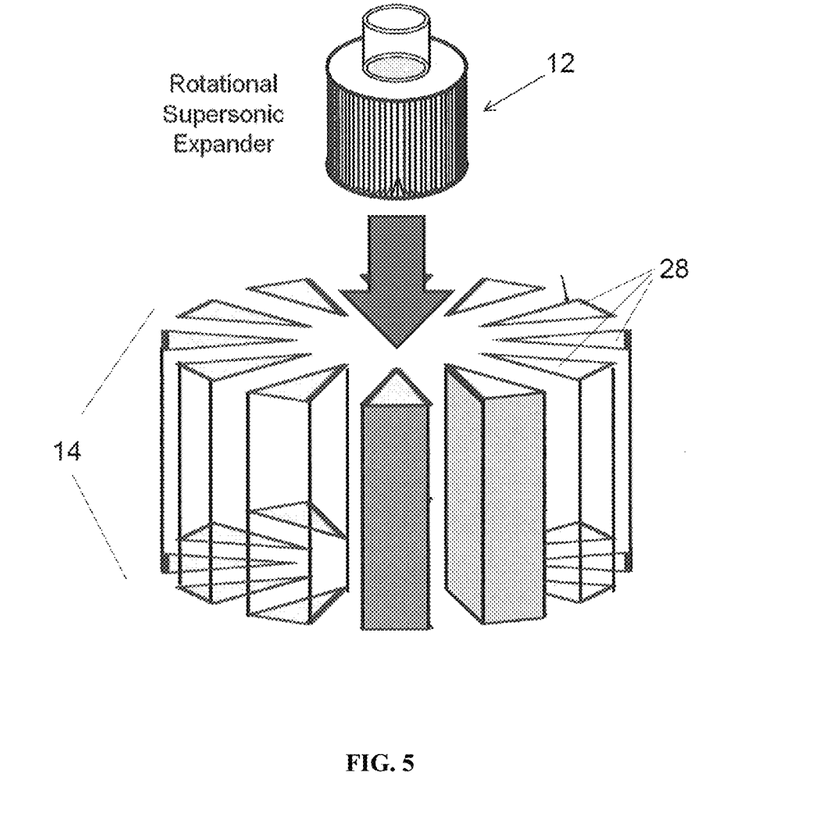
FIG. 5 is an exploded view of the system, in accordance with features of the present invention. The cylindrical supersonic expander nozzle array of the type shown in FIG. 3 and/
Figure 6:
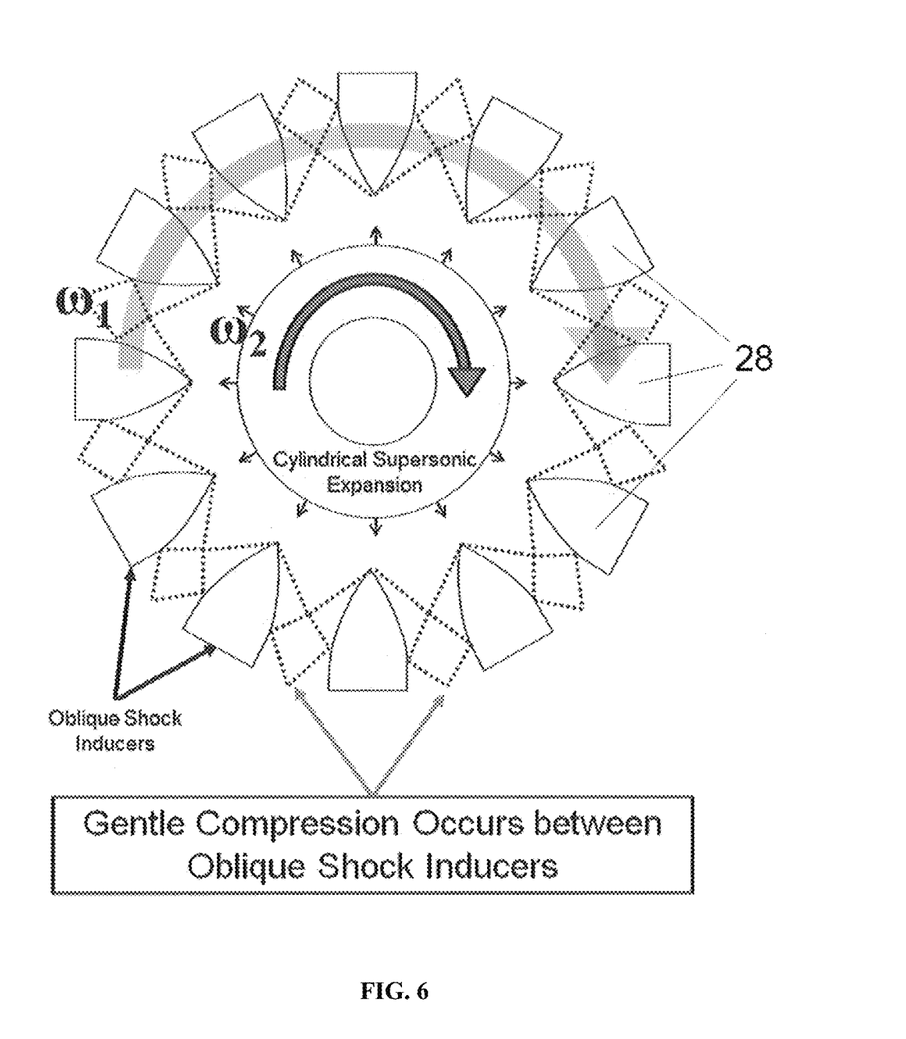
FIG. 6 is a cross sectional view of a columnar array of oblique shock inducer, in accordance with features of the present invention.

As depicted in FIG. 5, either expander 12 is configured to be co-axially received by the fluid compressor 14. While the expander rotates on the same axis as the compressor, the two structures may rotate in a rigid configuration (whereby the expander and compressor rotate as a single unit). Alternatively, the expander 12 may rotate at an angular velocity that is different than the angular velocity of the compressor 14. FIG. 6 shows the array rotating at a first velocity ω1 and the expander 12 rotating at a second angular velocity ω2.

The inventors have found that the formation and the separation of the precipitate is not just a function of pressure difference. It is also a strong function of aerodynamic design. Slight changes in diffuser geometry can significantly change the performance of the precipitation process.

The shock inducers are pointed up stream at the onset of the flow. They could define a straight surface like a wedge, in which case the inclination angle that the surface of the shock inducer makes with the radius is constant along the shock inducer. Alternatively, the inducers may define a more rounded apex (such as a bullet shape) in which case the inclination angle that the surface of the shock inducer makes with the radius continually decreases along the surface of the shock inducer. The best configuration may be a combination of these two extremes, and determined empirically.

The surface of the shock inducer may be formed by a series of straight line segments where each successive line segment in the series would make a smaller inclination angle with the radius. The crossing oblique shock pattern which is formed in this region of the flow would be maintained with a sequence of straight wall sections were the finite turning angle for each segment successively decreases and then remains constant until the next segment. The walls would have a finite turning angle at every point where the oblique shock waves reflects on the wall forming a new region.

For example, each of the oblique shock inducers are configured roughly as an elongated isosceles triangle stood on end with its tip or apex extending upstream or medially. The shock inducers are generally impermeable to the fluid with which they come in contact and are sufficiently rigid to impose their desired effect to the outwardly radially flowing fluid stream. A myriad of rigid materials are suitable as shock inducer constituents, including, but not limited to metals, plastics, carbon fiber, glass, composites, and combinations thereof.

The inducers may also be comprised of reversibly deformable materials such that the inducers reversibly deform during contact with radially directed fluids. Both passive and actively controlled deformable surfaces could be utilized. These deformable surfaces could be actively deformed in a controlled fashion, akin to ailerons on an air foil, or as a result of fluid flow inducing a torsional effect.

An embodiment of the compressor 14 comprises a plurality of oblique shock inducers 28 that are positioned as a columnar array. FIG. 6 is an aerial view of transverse section of the array of inducers 28. Also shown in FIG. 6 is the expansion hub (the expander 12) concentric with the columnar array of oblique shock inducers 28.

The center space defined by the compressor may include a myriad of mounting features. The center space can have an axle, or a plurality of concentric axles which are rigidly connected to the rotating nozzle array either by spokes or by some other rigid substrate forming a connection. The high-pressure reservoir would be situated around the axle and could include the axle and also the rigid connections. The center of the nozzle array, around the axle and any other connecting hardware, defines a reservoir volume where high pressure gas is introduced in the device before it flows radially out into the initial contraction sections of the nozzles.

Figure 7:
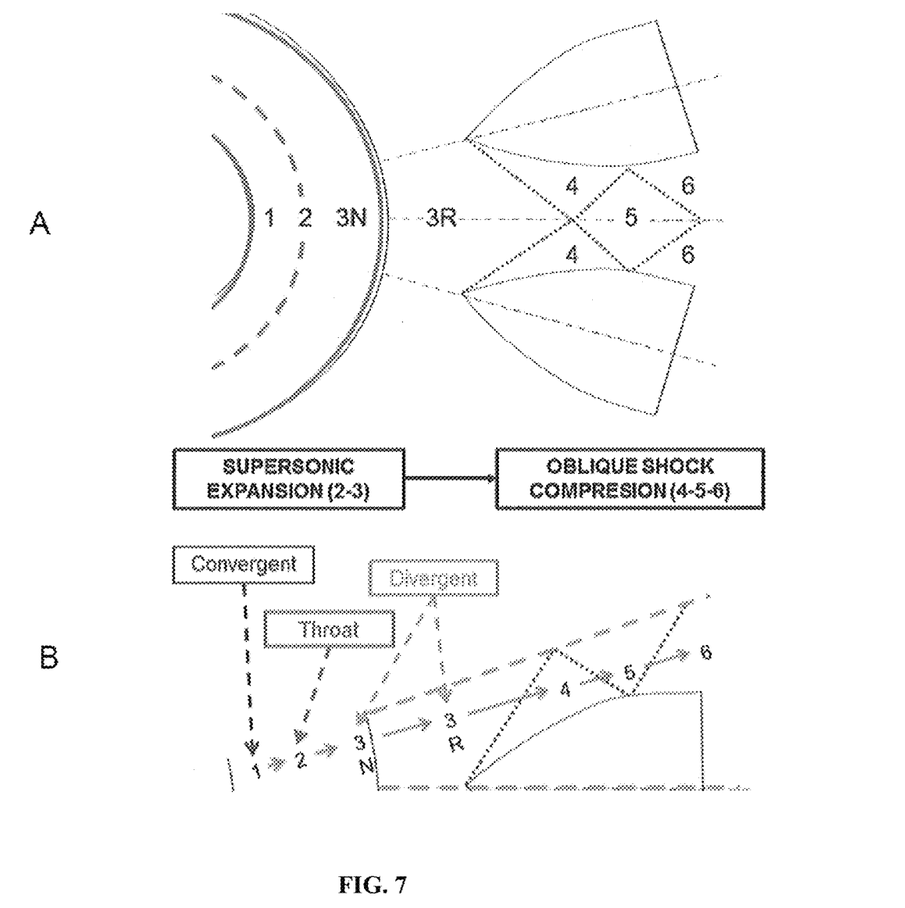

FIGS. 7A and B schematically depict the effects of the expander 12 and shock inducers 14 on radially flowing fluid. The aforementioned shape of the inducers invokes compression on the fluid flowing there between. Further, the inducers add centrifugal force to the radially-directed, multi-phase fluid without passing the liquid or solid phases through viscous boundary layers. (Generally, the boundary layers lie in close spatial relationship to the surfaces of the inducers.) As such, the inducers provide a means for preventing contact of the liquid- and solid-phases to the boundary layers. The zig-zag dotted line represents an oblique shock wave. The long, straight dashed lines define lines of symmetry.

FIG. 7A depicts an angular section of the cylindrical nozzle array with the subsonic acceleration region 1, followed by the throat section shown as the dotted line 2, and supersonic acceleration region 3N. Immediately outside of the supersonic acceleration region of the cylindrical nozzle array there is a region between the cylindrical nozzle array and the oblique shock inducers shown as region 3R. The supersonic gas flows radially from region 3R in between each element of the wedge shaped oblique shock inducers which are arranged in a concentric ring around the common axis of rotation. This causes a crossing oblique shock pattern to be formed in between each element of the shock inducers. The crossing oblique shock pattern that is formed in between the oblique shock inducers provides several distinct regions where the supersonic flow is sequentially re-compressed, and the temperature elevated in such a way so that the re-compression process maintains the carrier gas temperature and pressure so that any precipitate that has condensed out of the gas stream will remain in its condensed state. FIG. 7B shows the same regions as was shown in FIG. 7A separated by radial lines of symmetry.

In the annular region 3R upstream of the shock inducers 28 and the fluid flow regions 4, 5, 6, etc between the inducers, the radial time constant will be much smaller than the angular time constant. If the reference frame is fixed in inertial space then the entire flow field will have an angular velocity which is very close to the angular rotation of the device. This angular velocity will be much less than the radial velocity of the supersonic flow. This is because the entire flow is rotating more or less as a ridged body at a speed which has to be very much less than the speed of sound.

As is shown in the figure with respect to a reference frame that is fixed to the rotating component, there is a very small, almost insignificant, angular velocity component to the flow field. This can be understood to be like the Coriolis force which arises in situations having a non-inertial reference frame. It is due to the acceleration force that is always observed in a rotating reference frame. As in the field of ballistics, this force is usually significantly smaller than the other forces that are acting. It only becomes important when the length and time scales become very large. So, in this situation the gas will expand and be recompressed without introducing significant shear forces, and without smashing particles or droplets into the nozzle walls or the shock inducers even though the entire flow field is being rotated.

In light of the foregoing, the supersonic flows in this region will be inviscid and irrotational. There will be no viscous heating in this region. As such, the liquid and/or precipitate will not re-gasify.

In the annular region outside the shock inducers the axial and radial time constants may be of the same order allowing for mechanical separation.

Figure 8:
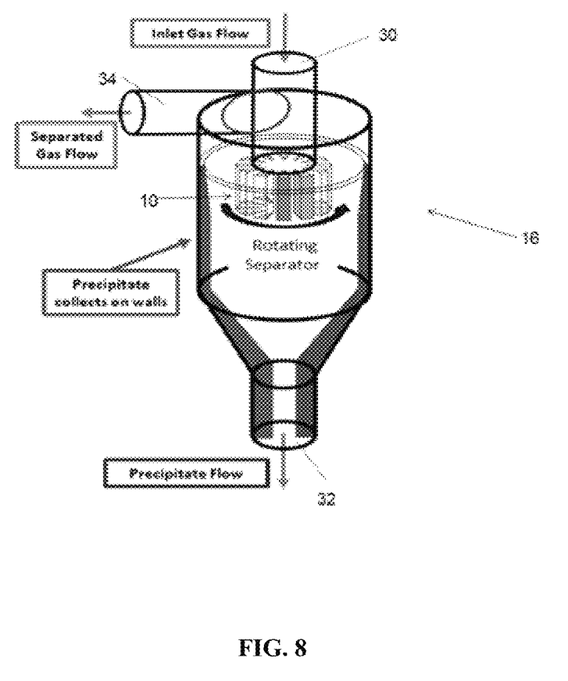
FIG. 8 is a schematic depiction of the separation process positioned within a liquids/solids remover, in accordance with features of the present invention.

FIG. 8 is a schematic depiction of the separation process within the aforementioned liquids/solids remover 16. Both the cylindrical supersonic nozzle array and the oblique shock inducer array are shown rotating within the confined of a collection vessel. The condensed precipitate collects on the inside wall of the containment vessel in the same way as a reverse cyclone and falls to the bottom were it is removed while the carrier gas flows out an exit path at the top. The solids remover 16 may be reminiscent in function to a reverse cyclone. Alternatively, separation means may be a device employing filters, settling chambers, scrubbers, etc, circumferentially positioned about the compressor 14 to define an annular space therebetween. The annular space should be wide enough to allow the nozzles, and particularly the fluid therethrough to achieve subsonic conditions. (As described supra, supersonic flow occurring inside the array of expansion nozzles.) The invented system 10 is seen coaxially positioned within the solids remover so as to be housed within or otherwise encapsulated by the solids remover 16. A feed stream inlet portal 30 to the remover 16 may be positioned at an upstream end of the remover. As such, the feed stream portal 30, the expander 12, the inducer 14, and the solids remover 16 may all be coaxially arranged with each other. A liquid/solids egress portal 32 may be positioned at a downstream end of the remover 16. Generally, it extends downwardly so as to be at the depending end of the remover. It too, may be coaxially arranged with the remover 16.

Inasmuch as the separated liquid- and/or solid-phase target material will settle to the lower portions of the remover 16, the lower half exterior surfaces of the remover 16 may be in thermal contact with a means for reducing the temperature of the surface so as to prevent regasification of the separated moieties. (The separated moieties are depicted in FIG. 8 as cross hatching.) A myriad of temperature reducing means are available, including, but not limited to ice baths, refrigeration coils, thermal exchange surfaces such as water loops, etc. Notwithstanding the foregoing, cooling duties of the instant method and system are reduced vis-a-vis conventional plants. This is because the novel positioning of the expander within the inducer minimizes time between liquids/solids formation and their ultimate expulsion from the system. In the instant method and system, fluid flow is supersonic and so it is moving very fast and has a very small residence time. There is not sufficient time for a conventional heat exchanger process to occur. Temperature changes in compressible flows can be made through expansion and mass depletion and not so much by boundary layer convection.

A second means of egress 34 may be positioned superior to the position of the expander/inducer combination and formed with the inlet portal 30. This second means provides an exit ramp for the still gasified portion of the feedstream. Alternatively, the second means of egress 34 may be formed with a side wall of the remover housing, as shown. This side wall intersect configuration provides a means for preserving the swirling flow in the annular region of the containment vessel.

It is to be understood that the above description is intended to be illustrative, and not restrictive. The above-described embodiments (and/or aspects thereof) may be used in combination with each other. In addition, many modifications may be made to adapt a particular situation or material to the teachings of the invention without departing from its scope.

While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

We claim:

1. A system for removing target moieties from gas streams, the system comprising a rotating supersonic expander coaxially positioned within a rotating array of oblique shock inducers.

2. The system as recited in claim 1 wherein the expander rotates at a first rate and the inducers rotate at a second rate.

3. The system as recited in claim 1 wherein the expander and the inducers are encapsulated in a reverse cyclone.

4. The system as recited in claim 3 wherein the expander, the inducers and the cyclone are coaxial to each other.

5. The system as recited in claim 4 wherein the cyclone is maintained at a temperature below ambient.

6. The system as recited in 1 wherein the expander comprises a plurality of nozzles, each of said nozzles defining a converging-diverging configuration.

7. The system as recited in claim 1 wherein the expander comprises nozzles arranged in a circular pattern.

8. The system as recited in claim 7 wherein the circular pattern defines a first cross section and the first cross section is less than a second cross section defined by the array of shock inducers.

9. The system as recited in claim 8 wherein the shock inducers are arranged in a columnar array defining the second cross section.

10. The system as recited in claim 1 wherein the shock inducers are shaped as isosceles triangles, each of said triangles are positioned with its apex upstream.

11. The system as recited in claim 1 wherein the array of oblique shock inducers is an axial array.

12. The system as recited in claim 1 wherein the array of oblique shock inducers is a circular array.

13. The system as recited in claim 7 wherein the array of oblique shock inducers is an axial array.

14. The system as recited in claim 7 wherein the array of oblique shock inducers is a circular array.

\* \* \* \* \*